United States Patent
Wasserstrom et al.

(10) Patent No.: US 12,223,052 B1
(45) Date of Patent: Feb. 11, 2025

(54) COMBINATION BOOT FOR AN INTEGRATED CIRCUIT

(71) Applicant: Amazon Technologies, Inc., Reno, NV (US)

(72) Inventors: Barak Wasserstrom, Mizpe Aviv (IL); Ori Cohen, Atlit (IL); Andrew Robert Sinton, Jerusalem (IL)

(73) Assignee: Amazon Technologies, Inc., Reno, NV (US)

( * ) Notice: Subject to any disclaimer, the term of this patent is extended or adjusted under 35 U.S.C. 154(b) by 167 days.

(21) Appl. No.: 17/695,630

(22) Filed: Mar. 15, 2022

(51) Int. Cl.
| H04L 9/08 | (2006.01) |
| G06F 21/54 | (2013.01) |
| G06F 21/57 | (2013.01) |
| G06F 21/60 | (2013.01) |
| G06F 21/76 | (2013.01) |

(52) U.S. Cl.
CPC ............ *G06F 21/575* (2013.01); *G06F 21/54* (2013.01); *G06F 21/602* (2013.01); *G06F 21/76* (2013.01)

(58) Field of Classification Search
CPC ...... G06F 21/575; G06F 21/54; G06F 21/602; G06F 21/76; G06F 21/57; H04L 9/08
See application file for complete search history.

(56) References Cited

U.S. PATENT DOCUMENTS

| 5,937,154 A | 8/1999 | Tegethoff | |
| 7,330,967 B1* | 2/2008 | Pujare | G06F 9/4411 717/170 |
| 8,667,264 B2 | 3/2014 | Huang | |
| 9,230,112 B1 | 1/2016 | Peterson et al. | |
| 9,864,007 B2 | 1/2018 | Deutsch et al. | |
| 10,678,555 B2 | 6/2020 | Johansson et al. | |
| 11,615,190 B2 | 3/2023 | Liu et al. | |
| 11,650,741 B2 | 5/2023 | Kloth | |
| 11,720,683 B2 | 8/2023 | Herberholz et al. | |
| 2005/0125407 A1 | 6/2005 | Kraus et al. | |
| 2005/0228980 A1 | 10/2005 | Brokish et al. | |
| 2010/0017659 A1 | 1/2010 | Dos Remedios | |
| 2010/0042824 A1 | 2/2010 | Lee et al. | |
| 2012/0253731 A1 | 10/2012 | Akdemir et al. | |
| 2015/0046970 A1* | 2/2015 | Shimizu | H04L 63/20 726/1 |
| 2018/0285094 A1* | 10/2018 | Housel | G16H 30/20 |
| 2020/0081846 A1 | 3/2020 | Brokish et al. | |
| 2020/0218544 A1 | 7/2020 | Ganesan et al. | |
| 2020/0302090 A1* | 9/2020 | Doerr | G06F 15/163 |

(Continued)

OTHER PUBLICATIONS

Non-Final Office Action issued in U.S. Appl. No. 17/592,016, dated Jan. 19, 2024.

(Continued)

*Primary Examiner* — Quazi Farooqui
(74) *Attorney, Agent, or Firm* — Hogan Lovells US LLP

(57) ABSTRACT

A boot process for a computing device, such as integrated circuit, includes security features that are inaccessible during certain operation modes. An image including permission to access those security features is received during the boot process and may be verified using one or more keys. In operation, access to the security features is permitted during the operation modes after the image is verified. Such an approach enables a boot process to permit access to certain features after receipt and verification of different images.

20 Claims, 7 Drawing Sheets

(56) References Cited

U.S. PATENT DOCUMENTS

2021/0319110 A1* 10/2021 Edery ................. G06F 12/1081
2021/0406380 A1   12/2021 Poulard et al.
2023/0315913 A1* 10/2023 Chandra ............... G06F 21/572
                                                    726/26

OTHER PUBLICATIONS

Final Office Action issued in U.S. Appl. No. 17/592,016, dated Jun. 4, 2024.
Notice of Allowance issued in U.S. Appl. No. 17/592,016, dated Aug. 21, 2024.

* cited by examiner

COMBINATION BOOT FOR AN INTEGRATED CIRCUIT

BACKGROUND

Many existing computing systems utilize various system on chip (SoC) components, which essentially integrate a computing device or platform into an integrated circuit or similar component. Often, SoCs include various security protocols to ensure that authorized users have access to different features, such as features that may permanently change one or more aspects of SoCs. High security features may be protected by one or more booting sequences, such as measured boot, which may use remote attestation in order to verify different stages of the boot process. While these features provide high levels of security, they also reduce flexibility with respect to updating because various features of the measured boot are immutable.

BRIEF DESCRIPTION OF THE DRAWINGS

Various embodiments in accordance with the present disclosure will be described with reference to the drawings, in which.

DETAILED DESCRIPTION

Figure 1:
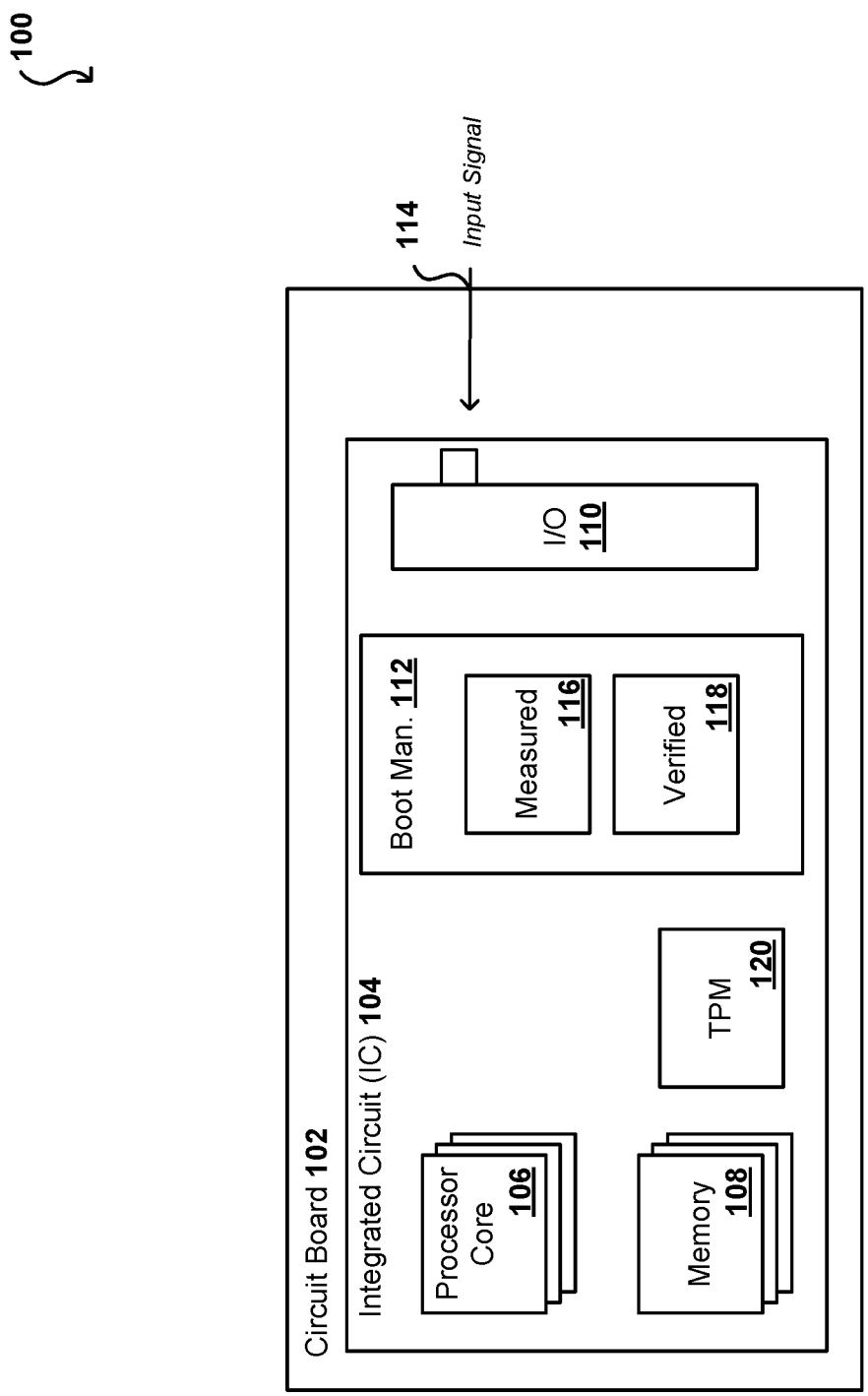
FIG. 1 illustrates an example computing system utilizing a boot manager that can be utilized in accordance with various embodiments.

Approaches in accordance with various embodiments can be used to run a computing device or component, such as an integrated circuit (IC) (e.g., a microprocessor, or a system on chip (SoC)). In particular, various embodiments can utilize a measured boot process in combination with one or more verifications (e.g., verified boot) during the boot process in order to permit or deny access to one or more security features (e.g., boot features) of the IC. As a result, different permissions may be granted while maintaining the security benefits provided using the measured boot process. In at least one embodiment, in combination with the measured boot process, one or more signed images may be evaluated. If the signature if verified, the image may be loaded, which may permit access to one or more features of the IC that would otherwise be blocked or locked as a result of the measured boot process. In this manner, particular functionality may be enabled while maintaining the security benefits of measured boot.

Various embodiments enable more flexible boot runs that may be smaller and less complex, thereby providing improvements for debugging and reliable operation of the computing device or component. Systems and methods further provide improvements over one or more other boot processes, such as a full measured boot or a full verified boot. For example, while a measured boot may reduce operational risks by managing booting at a control plane for attestation, the software or systems executing on the local system may not be trusted or verified, thereby enabling a malicious actor to operate within an endpoint (e.g., the computing device or component). With respect to a verified boot, software executing on the system may be controlled, but the signature process may lead to loading errors for images because a single incorrect signature within a chain caused the entire boot to fail. Embodiments of the present disclosure overcome these problems by initially implementing a measured boot process to maintain security and remote attestation prior to enabling an endpoint to connect to a network. Furthermore, various embodiments also implement different signature verification steps with respect to specific features or images associated with the boot process. As a result, security benefits associated with measured boot are maintained while also permitting one or more tasks or actions using different verification steps, thereby preventing lock out or disabling of features that may normally be associated with measured boot.

In at least one embodiment, systems and methods of the present disclosure are directed toward one or more hardware locks to control or otherwise secure different features during a boot process for a computing device, such as an IC. A signed request may be received for verification during a boot process, such as a measured boot process, in order to permit or otherwise authorize access to one or more features. Upon verification, certain features may no longer be locked out or blocked, as would normally occur during the boot process, thereby providing improved flexibility to the system while maintaining security and remote attestation.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

FIG. 1 illustrates an example computing system 100 incorporating a boot manager that can be utilized in accordance with various embodiments. This example includes a circuit board 102 including an integrated circuit (IC) device 104, which may be a system on chip (SoC) device. The circuit board 102 may include a substrate, such as a fiberglass resin, that includes traces for interconnections between components. The IC device 104 may be inserted into a computing device, for example, a computing device utilized within a data center for distributed computing services. This IC may be configured to perform specific tasks on behalf of the computing device, using one or more processors, processor cores 106, or microcontrollers on the IC, as may include one or more central processing units (CPUs), graphic processing units (GPUs), digital signal processors (DPSs), or cores of those components. The IC 104 can include one or more types or instances of memory 108 or storage, as may include flash memory. The IC 104 may also include communication buses and circuitry, as may relate to one or more application-specific integrated circuits that may each be customized for a particular use. The IC 104 may also have one or more I/O components that allow for data input and output, as well as the providing of control signals, that may come from components on the circuit board 102, a computer into which this board is installed, or an external device. Other system configurations can be used as well within the scope of various embodiments, such as a system on board (SoB) configuration that may have similar interfaces.

The early behavior of such an SoC after reset, or another such action, can be defined using a physical interface, such as a set of pins. In at least one embodiment, these pins can be general purpose I/O pins, or GPIOs 110. The state of these pins (e.g., high or low) at boot or reset can determine important features of the microcontroller, such as output voltages to one or more components. As a result, an initial input signal may be utilized to trigger one or more hardware locks associated with operation of the IC 104, such as blocking access to various features. For example, a certain input voltage may be transmitted along a particular communication pathway and not along another, where the other pathway may enable access to cryptographical material (e.g., passwords, keys, hashes, fuses, etc.) that may be utilized to make permanent changes to the IC that may affect later operations.

This example includes a boot manager 112 arranged to receive a signal transmitted to the GPIO 110. The boot manager 112 may include one or more hardware configurations that includes logic or circuits, along with one or more memory devices, to execute operations responsive to a signal from the GPIO 110. Accordingly, the boot manager 112 may operate on hardware that is separate from the cores 106, but may also affect or otherwise influence how software interacts on the system as part of a boot process. The boot manager 112, upon receipt of an input signal 114, may facilitate one or more boot operations or processes for the IC 104. The selected boot operations may be directed by the input signal 114, such as executing with one type of operation upon receipt of a first signal and a second type of operation upon receipt of a second signal. In this example, the boot manager 112 includes configurations to operate using a measured boot 116 and a verified boot 118, but it should be appreciated that various embodiments may include more or fewer options.

In various embodiments, a measured boot process may refer to a boot process that evaluates a configuration of a client device by taking secure measurements, which may be in the form of cryptographic hashes, of the configuration of the client device (e.g., software configurations, hardware configurations, etc.). These measurements may then be stored in a trusted platform module (TPM) 120. It should be appreciated that a TPM is provided by way of example only and is not intended to limit the scope of the present disclosure. For example, alternatives to the TPM may be included within the IC 104, including proprietary configurations, that may include one or more secure cryptoprocessors and/or chipsets. Furthermore, various embodiments may incorporate features associated with Platform Trust Technology. Furthermore, systems and methods may incorporate a hardware security module. The TPM 120 may contain several platform configuration registers (PCRs) that allow for secure storage and reporting of the stored hashes. However, the PCR is a one-way register in that it cannot be cleared and may only be expanded, that is, a new value is added to whatever was previously in the PCR. Thus, as the platform boots, each measurement can be accumulated in the PCR in a way that demonstrates which modules were loaded. The values may then be reported, along with a signature, to a remote attestation server. The server can examine the values and associated logs to determine if the platform is running an acceptable image.

While this process provides various security benefits, such as reduced operational risks due to the remote attestation or maintaining all keys and hashes within the endpoint (e.g., IC 104), there are also drawbacks such as enabling any software to load on the system along with reduced flexibility and more complex debugging. Embodiments of the present disclosure address at least these shortcomings by incorporating the verified boot 118 alongside the measured boot 116 to provide improved flexibility and security.

The illustrated verified boot 118 may refer to a boot process where each step in the boot process checks a cryptographic signature of an executable before launching and proceeding down the chain. For example, a first image may be received and a signature may be evaluated, then a second image may be evaluated, and so forth. The signatures for these objects generally correspond to private keys that are checked using public keys stored within the IC 104, such as within memories 108. During verified boot, if any of the objects within the chain are deemed to have an invalid signature, the entire boot process is abandoned and the images will not boot. In various embodiments, an image may refer to a boot image that, when transferred onto a boot device, allows associated hardware to boot. The boot image may include a computer file that contains an operating system, diagnostic data, and/or recovery information, among other options. Verified boot provides various security advantages, such as controlling and monitoring each application booting on the system. However, verified boot processes may lead to endpoints that are nonresponsive due to images that do not load, and moreover, increases complexity due to the management of public and private keys, which can be cumbersome in large scale applications where different features may be updated frequently. Systems and methods of the present disclosure may incorporate features of verified boot into a measured boot process by having early stages of the boot process executed with measured boot and designating specific permissions or actions for clearance via verified boot. In this manner, measured boot may secure or otherwise "lock" certain operations by default if permissions have not been received via images associated with verified boot. Furthermore, embodiments of the present disclosure may allow images to boot, even with invalid signatures, but without providing various security permission requested or associated with the image.

During a boot process, boot-time drivers can be loaded into a boot-time environment, such as a driver execution environment (DXE), and boot hardware configuration data can be stored to protected or secured resident or non-volatile memory on the device. A separate runtime loader environment (RLE) can be loaded that can use this boot hardware configuration data to load and apply runtime drivers, storing runtime configuration data to this protected memory. In this way, the runtime execution model code corresponding to those runtime drivers can be made accessible to an operating system (OS) or processing component (e.g., an IC, or an expansion card with processing capability) of the computing device, for example, via one or more runtime application programming interfaces (APIs).

For many computing devices, the devices will go through a process of hardware initialization and setup before an operating system (OS) is able to be executed after a boot or reboot action is triggered. At least a portion of this process is driven by a system Basic Input/Output System (BIOS) component, such as may take the form of an EEPROM or flash ROM on a motherboard of a computing device that contains relevant code or instructions. The BIOS in many systems is the lowest level of software that interfaces with the device hardware, and provides an interface through which an OS kernel or bootloader can communicate with that hardware. At startup or boot, the BIOS can initiate a power-on self-test (POST) process to detect, initialize, and test hardware on the device. After this POST Process has completed, the BIOS can then begin to boot the computing device with the determined settings, with control eventually being handed to an OS that is executed on the device. For devices that utilize a conventional Unified Extensible Firmware Interface (UEFI)-based boot process, there can be three phases to such a boot process, as may include a security phase, an initialization phase, and a driver execution environment (DXE) phase.

Various embodiments may designate measured boot as a default or primary boot operation for different stages of this boot process, such as during the security phase, among other options. For example, hardware initialization may be designated to occur during the measured boot and then a run loader and/or a kernel may incorporate features of the measured boot and/or the verified boot. Various security features, such as access to cryptographic information (e.g., bashes, signatures, keys, etc.) may be allocated to the measured boot process, but if an image associated with verified boot is received, then different actions or properties may be permitted through verified boot through analysis of different signatures. By way of example only, if firmware is update for an IC, hash measurements may differ when compared to the original instance launch. Because these hash values are stored within the TPM, they may not be "unsealed" or replaced, only added to, and as a result, they may be considered locked. Embodiments of the present disclosure may enable these values to be unsealed and then resealed by executing one or more verified boot processes, where an image may include the necessary keys or hash values in order to reseal the various operations associated with measured boot, even after the update.

Figure 2:
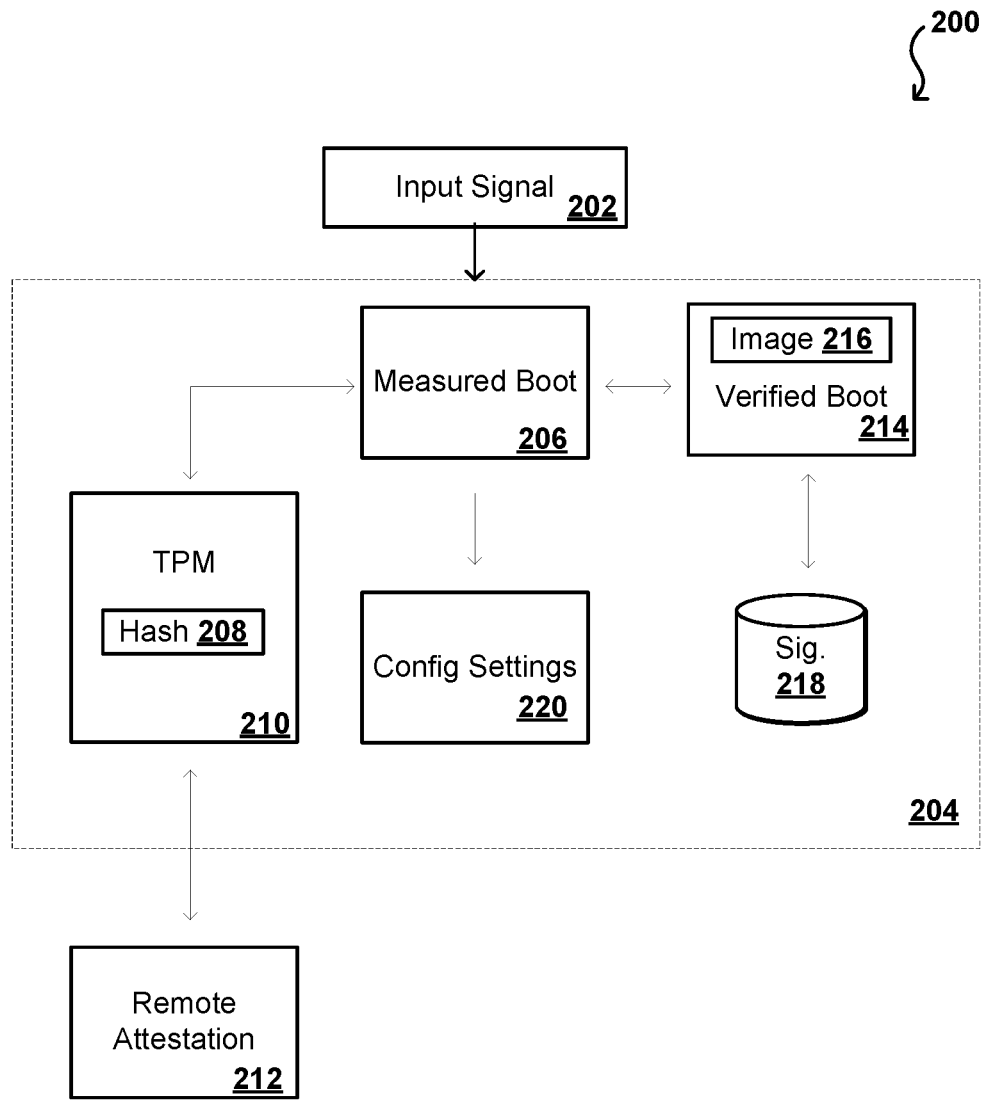
FIG. 2 illustrates components of a management architecture that can be utilized in accordance with various embodiments.

FIG. 2 illustrates an example environment 200 for executing a boot process that can be utilized in accordance with various embodiments. In this example, an input signal 202 is provided to an IC 204, such as an SoC as described above, that may correspond to one or more commands or instructions for a boot process. The input signal 202 may be provided along with a restart or reboot signal or may be provided prior to a reboot for execution on the next reboot. The input signal 202 may further include information, such as one or more images corresponding to objects to be executed by the IC 204. At start up, BIOS may initialize the hardware and proceed to a first stage bootloader, which may load images from memory, such as embedded RAM and launch a second stage bootloader. In this example, early stage boot operations may be managed using a measured boot service 206 to manage or execute a measured boot process. As noted above, the measured boot process provides the benefits of a simplified boot by utilizing a hash 208 from a TPM 210 to enable remote attestation 212 to permit access to one or more network features, among other options. As a result, configurations for the IC 204 may be checked and verified prior to allowing connection to various resources or networks. As previously discussed, the TPM 210 is provided by way of example only and may be replaced or utilized with one or more alternative trusted coprocessors or cryptoprocessors, among other options.

In at least one embodiment, the measured boot 206 may block or otherwise lock out certain features associated with the IC 204. These features may be features with security implications, such as enabling fuse burn, providing access to cryptographic materials, providing access to keys, making changes to boot processes, and the like. Maintaining these features within the measured boot operation may provide an improved security profile, while also enabling a simplified boot process. However, in certain embodiments, it may be desirable to permit access to one or more of these features or to enable a user to make changes with security implications. Accordingly, systems and methods of the present disclosure may utilize a verified boot service 214 to manage or execute a verified boot process that evaluates one or more images 216 that may correspond to permissions to perform certain tasks on the IC 204. For example, the verified boot service 214 may be utilized with one or more processors, such as processors of the TPM 210, to check signatures associated with images 216 provided to the verified boot service 214. The images 216 may be provided along with the input signal 202 for evaluation by the verified boot service 214 prior to loading of the instructions associated with the images 216. The images 216 may include instructions that permit execution of one or more tasks on the IC 204, such as fuse burning, updating boot parameters, and the like. As noted herein, various actions may be managed by default by the measured boot service 206 to be restricted unless otherwise allowed by one or more images 216 that have been verified via the verified boot service 214.

The images 216 may be signed using one or more keys, such as a private key, which may be checked using one or more public keys stored on the IC 104, such as within one or more signature databases 218. During the boot process, the images 216 may be evaluated, and if there are multiple images in a chain, may each be evaluated prior to loading a subsequent image in a sequence of images. Furthermore, each image may include instructions for multiple different tasks or actions, for example, permissions to perform one or more security features associated with the IC 204, such as accessing keys, changing a boot process, permitting fuse burn, and the like. A successful verification may cause one or more operations typically closed or otherwise restricted by the measured boot 206 to not be restricted. In other words, one or more actions that would normally be restricted may be permitted due to the verification of the images 216.

The measured boot process may continue after the images 216 are evaluated and, if an image to permit access to one or more features is not received, those features may be locked or otherwise restricted during the current boot of the IC 204. For example, one or more hardware locks may be implemented such that signals are blocked from reaching certain blocks or chip sets that are utilized to perform high security tasks. In another example, one or more locked pins may be utilized that are blown or otherwise burned based on the instructions provided with the image. Additionally, in various embodiments, software restrictions may be implemented to prevent certain functions or commands from executing. Accordingly, different configuration settings 220 may be established and utilized for different boots. It should be appreciated that subsequent boots that do not include the images 216 may not permit access to various features, as the measured boot process does not include a memory or history of previous boots, and as a result, the images 216 will be evaluated at each boot to determine whether or not various actions are permitted. In at least one embodiment, images 216 may be loaded multiple times, thereby reducing a number of signatures or keys to manage and update. Accordingly, systems and methods may be deployed in order to utilize features of both measured boot and verified boot within a single boot operation.

Figure 3:
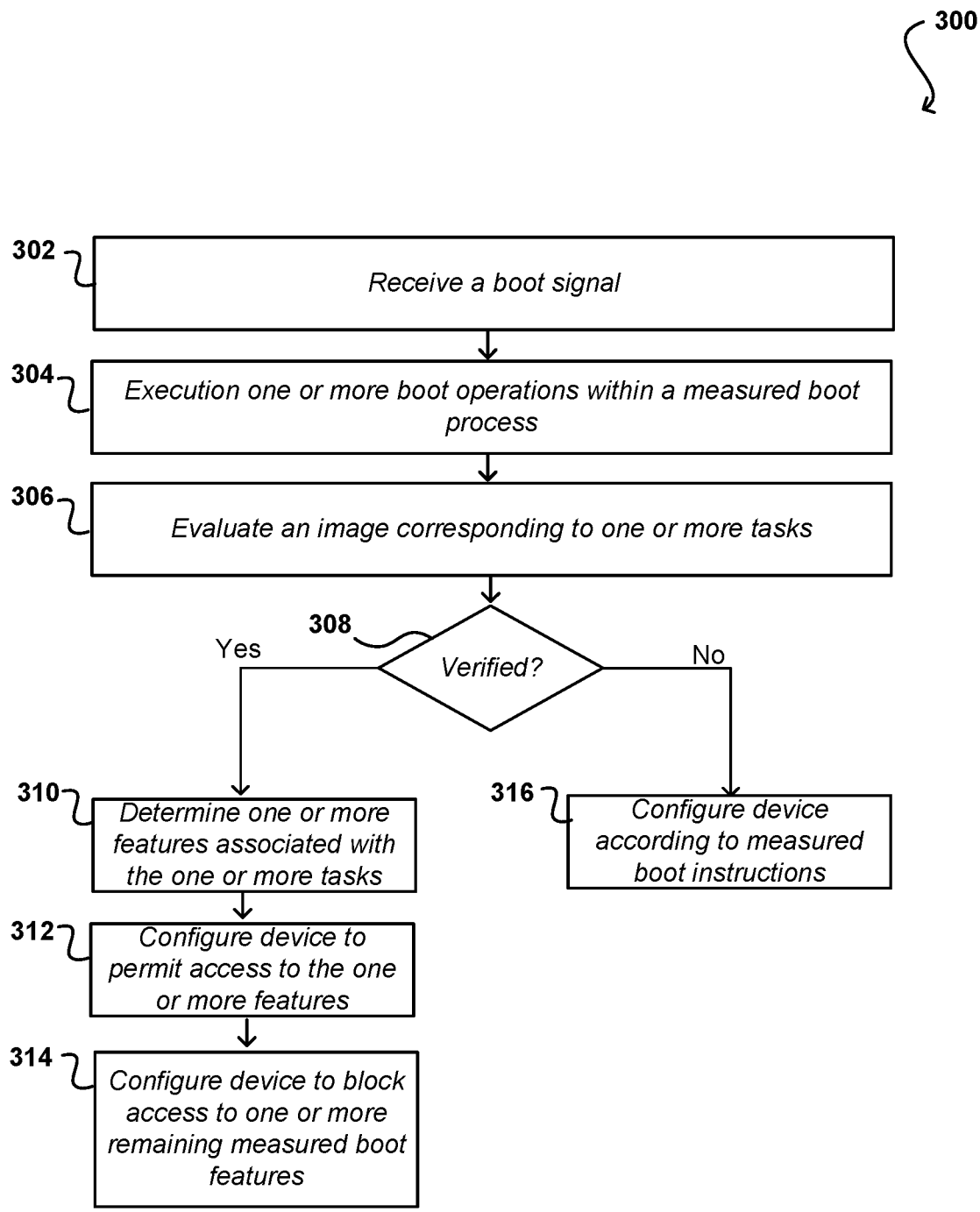
FIG. 3 illustrates an example process for verifying an image during a boot process that can be utilized in accordance with various embodiments.

FIG. 3 illustrates an example process 300 for a boot operation that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, while this example is discussed with respect to an IC, such as an SoC device, it should be understood that aspects of various embodiments can be used with other computing and processing devices as well, or for other methods of data transfer. In this example, a boot signal is received 302. In at least one embodiment, a boot signal may be provided after a reset or a restart event and may correspond to a signal to initiate a restart. The boot signal may also be received prior to a restart, such as during use of the IC, where the boot signal corresponds to an instruction on how to initialize the IC on the next boot. In at least one embodiment, the boot signal includes information to enable configuration of a device at restart, and may further include information such as one or more images or instructions to retrieve images from a memory location, among other options. It should be appreciated that the boot signal may be a local signal, such as from a user utilizing the device, or may be a remote signal, such as from a control level or a system manager that transmits the signal from a remote location.

A boot process may begin with execution of one or more boot operations within a measured boot process 304. For example, one or more features (e.g., security features) or permissions may be allocated to the measured boot process, such as certain actions with security implications, such as access to cryptographic information (e.g., keys, hashes, logs, etc.), permission for fuse burning, boot parameters, and the like. One or more of these features may, by default, by locked or otherwise restricted absent one or more particular input signals or permissions. As the boot process proceeds, an image may be evaluated 306. The image may be associated with information corresponding to permission to execute one or more tasks. The tasks may be associated with one or more security features, which may be certain commands or instructions that have security implications, such as access to keys, changing NVM, and the like. The image may be a signed image, which may include one or more keys (e.g., a private key, a public key, etc.) that is checked against one or more key data stores associated with the IC. It should be appreciated that there may be multiple images that are evaluated in a sequence or chain.

The image may be evaluated in accordance with one or more steps of a verified boot process, where a signature is verified prior to launching the image. Verification may include checking the signature against a corresponding key, such as a key stored on the IC. If there are multiple images in a chain, each image may be checked prior to evaluation of a subsequent image, where a failure of one may correspond to a failure of all. It may be determined whether or not the image is verified 308. If so, one or more features associated with the tasks may be determined 310 according to the instructions of the verified image. The features may include certain operations or accesses that are necessary or otherwise designated for the one or more tasks, such as access to cryptographic materials, among other options. The device may be configured to permit access to the one or more features 312. For example, the one or more features may correspond to operations that are normally locked or otherwise inaccessible during the measured boot process and/or a normal boot process, but due to the presence of the verified images, may now be accessible. The device may then further be configured in accordance with properties of the measured boot process 314, which may include blocking access to one or more additional features. As a result, a measured boot process may be specified with a particular set of instructions that are only bypassed when verified images are provided with the boot signal. In at least one embodiment, verification of the image may fail, and as a result, enhanced or elevated security permissions will not be granted during the boot. Instead, the original boot process may continue, which may include loading the unverified images, but without the enhanced security features, to configure the device to operate according to the boot instructions 316. It should be appreciated that while embodiments may discuss configurations according to a measured boot process, in other examples, alternative boot processes may be utilized with the above-referenced verification process. That is, a normal or standard boot, which may be a measured boot, may be defined and then executed, where images are evaluated to determine whether advanced permissions should be granted, and if the images are not verified, then the enhanced permissions are not granted, but the boot process continues with the default or standard configuration.

Figure 4:
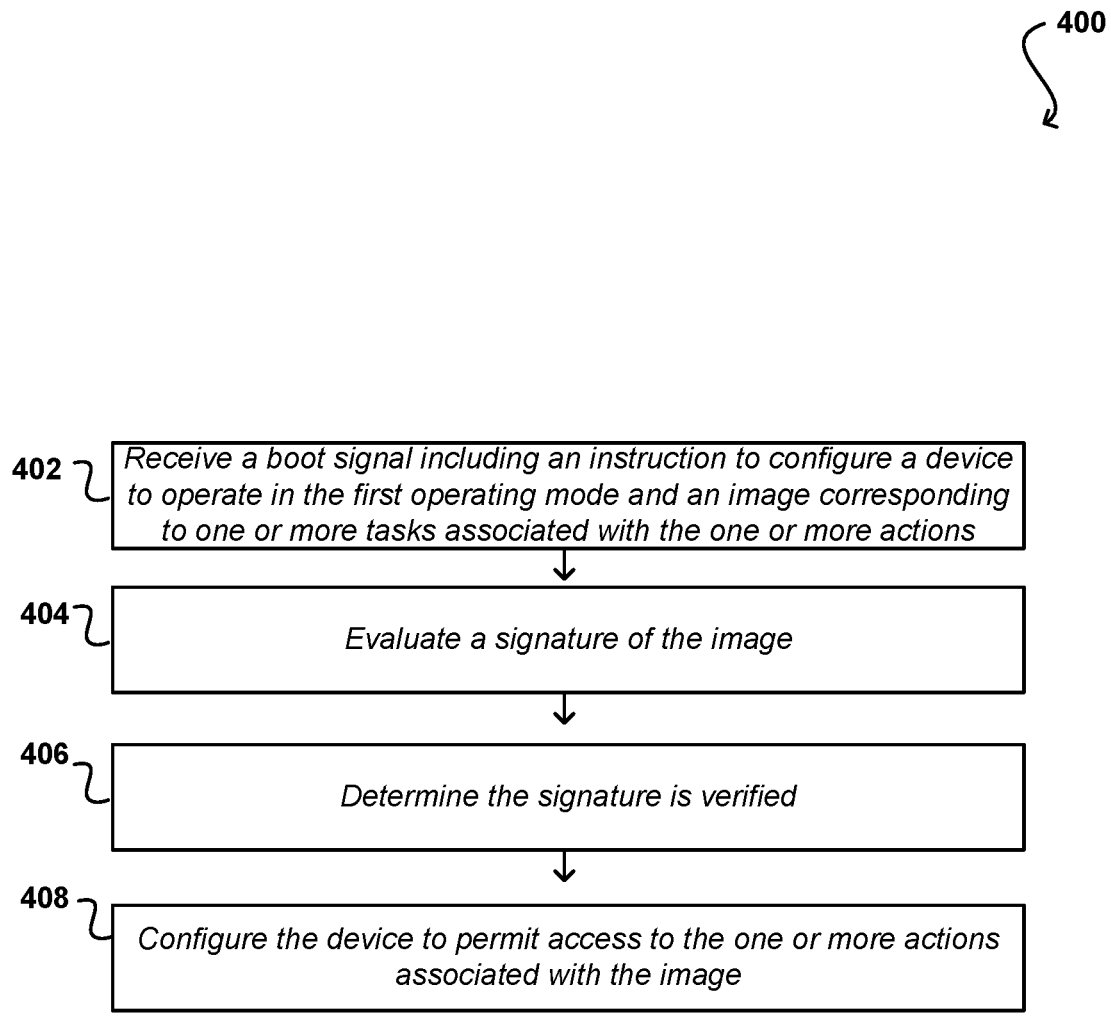
FIG. 4 illustrates an example process for providing access to one or more actions during a boot process that can be utilized in accordance with various embodiments.

FIG. 4 illustrates an example process 400 for executing a boot process that can be utilized in accordance with various embodiments. In this example, permissions for a first operating mode may be defined 402 by an operator of the IC. The first operating mode may correspond to an operational mode with limited security access, such as a normal operation mode where users will utilize certain software capabilities but will not have access to features with security implications, such as access to NVM. In operation, a device may execute using a measured boot process, which may have certain security settings based on different boot operating modes. One or more actions that are inaccessible during the first operating mode may be defined such that access to these actions is blocked by default, in the absence of alternative instructions to permit access. The definition of these one or more actions may be part of the first operating mode or may be integrated into a measured boot process where, by default or as a baseline level of security, the one or more actions may be inaccessible during certain operating modes. In at least one embodiment, the one or more actions correspond to actions with security implications, such as access to cryptographic materials, ability to burn fuses, access to NVM, permission to change boot instructions, and the like. Accordingly, these actions may be preferentially blocked in situations where the operating mode is not a high security mode, such as normal operating modes or testing modes.

In at least one embodiment, a boot signal may be received to be executed upon a restart or a reboot 402. The boot signal may be received prior to a restart process or may be received along with an instruction for a restart or reboot. The boot signal may include instructions, such as an instruction corresponding to an operating mode for configuration at the restart. In this example, the boot signal may further be accompanied by an image or an instruction to retrieve an image, where the image may correspond to one or more tasks to be performed that are associated with the one or more actions. For example, the image may correspond to permission to permit access to boot instructions, among other options. In at least one embodiment, the image is signed with a key, such as a public or private key, that may be checked or verified by device. For example, the device may evaluate the signature 404, such as by comparing keys or hashes, and determine the signature is verified 406. It should be appreciated that multiple images may form a chain and that each image within the chain will be evaluated and verified prior to loading of any of the images. If the signature is verified, then the device may be configured to permit access to the one or more actions associated with the image 408. That is, the default configuration of the measured boot may be overruled by the verification of the one or more images, thereby permitting certain special permissions for an individual boot in accordance with the image. At restart, the permissions may be removed unless the next boot signal is accompanied by verified images providing access to the one or more actions.

In at least one embodiment, a boot image is provided to an IC, such as an SoC device. The boot image may include a computer file that includes instructions corresponding to a permission to perform one or more requests, where the requests may be associated with a permission to perform an action that has security implications, such as modifying NVM, accessing cryptographic information, accessing keys, changing a boot process, performing a fuse burning operation, or the like. The action may be an action that is typically not permitted during a normal boot process. That is, upon boot, a normal boot process may begin with a certain normal set of permissions that are granted absent a verified image that enables enhanced or additional permissions. In at least one embodiment, the boot image is a signed boot image that includes a key. One or more processors may be used to evaluate the key, for example against a key that is stored on the IC, to determine whether the image is a verified image. A verified image will boot such that the requested permissions are granted. The remaining boot process may then continue, where other actions that are normally restricted during the boot process remain restricted absent verification of additional images or permissions.

In at least one embodiment, a second image may be received that includes instructions corresponding to a permission to perform one or more additional requests, which may also be associated with one or more additional actions that have security implications. The second image may also be signed by a key, which may be evaluated against a key that is stored on the IC. If verification fails, such as the key being invalid, then permissions requested by the second image will not be permitted, but the image may otherwise load such that the boot process is not halted due to the verification failure. Instead, the normal boot process will continue and various actions will be restricted absent a verified image requesting permission for enhanced security permissions.

Figure 5:
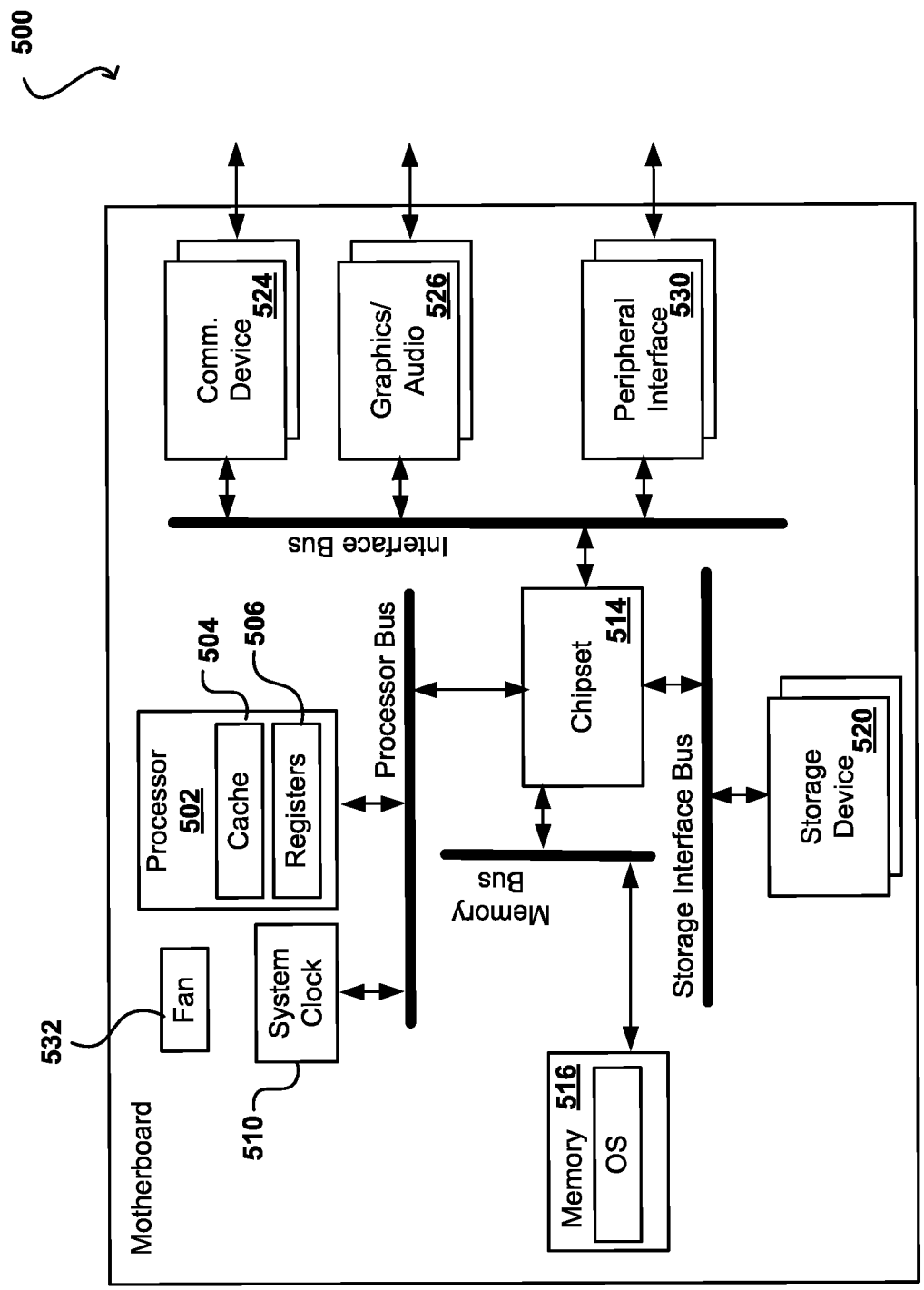
FIG. 5 illustrates components of an example computing device that can be utilized in accordance with various embodiments.

Computing resources, such as servers, that can have software and/or firmware updated in such a matter will generally include at least a set of standard components configured for general purpose operation, although various proprietary components and configurations can be used as well within the scope of the various embodiments. FIG. 5 illustrates components of an example computing device 500 that can be utilized in accordance with various embodiments. As known for computing devices, the computer will have one or more processors 502, such as central processing units (CPUs), graphics processing units (GPUs), and the like, that are electronically and/or communicatively coupled with various components using various buses, traces, and other such mechanisms. A processor 502 can include memory registers 506 and cache memory 504 for holding instructions, data, and the like. In this example, a chipset 514, which can include a northbridge and southbridge in some embodiments, can work with the various system buses to connect the processor 502 to components such as system memory 516, in the form or physical RAM or ROM, which can include the code for the operating system as well as various other instructions and data utilized for operation of the computing device. The computing device can also contain, or communicate with, one or more storage devices 520, such as hard drives, flash drives, optical storage, and the like, for persisting data and instructions similar, or in addition to, those stored in the processor and memory. The processor 502 can also communicate with various other components via the chipset 514 and an interface bus (or graphics bus, etc.), where those components can include communications devices 524 such as cellular modems or network cards, media components 526, such as graphics cards and audio components, and peripheral interfaces 530 for connecting peripheral devices, such as printers, keyboards, and the like. At least one cooling fan 532 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 502 can obtain data from physical memory 516, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 504 in at least some embodiments. The computing device 500 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 330, a communication device 524, a graphics or audio card 526, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 502 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a processor bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 6:
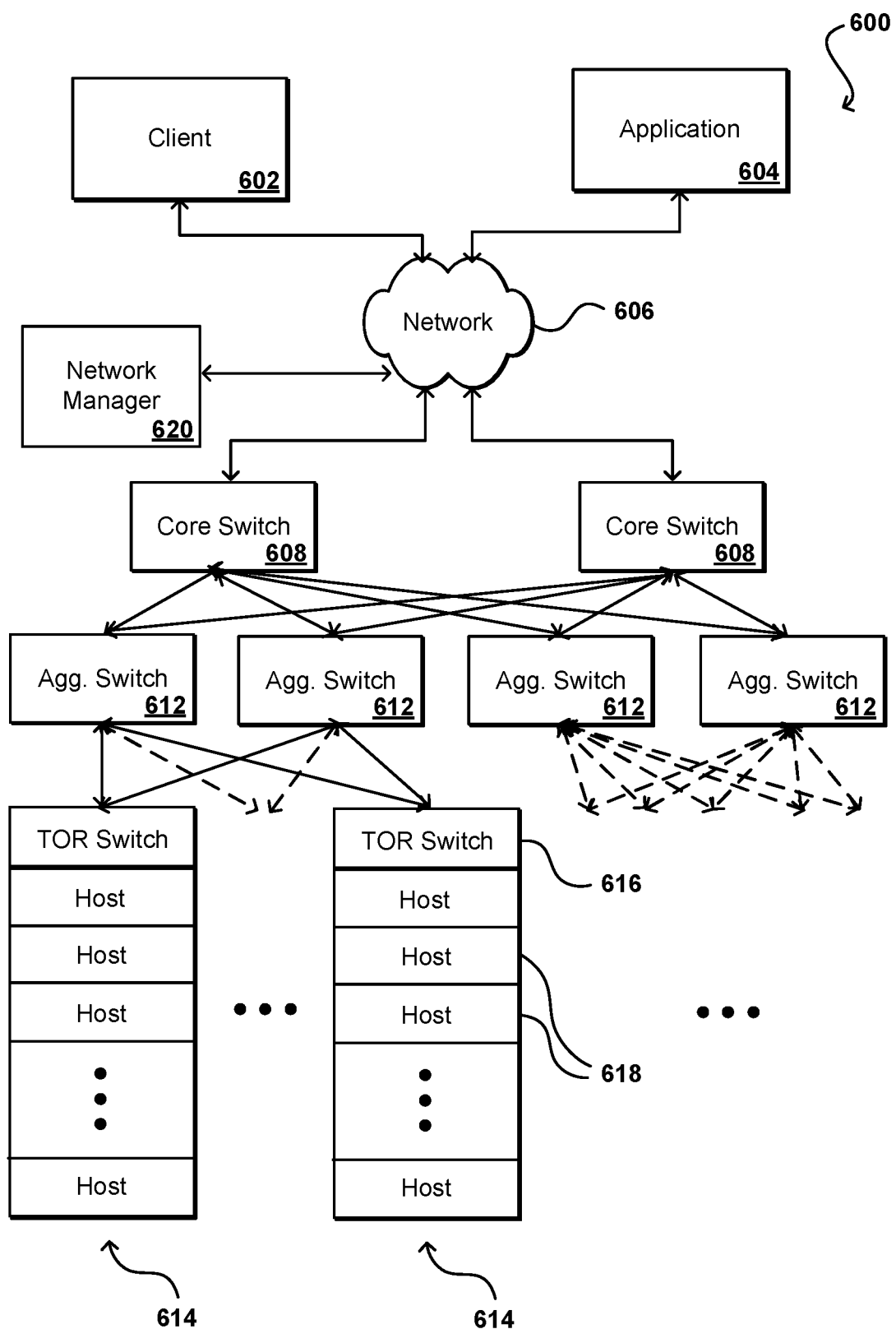
FIG. 6 illustrates components of an example data center environment in which aspects of various embodiments can be implemented.

As mentioned, SoC devices may be utilized in a shared resource environment, such as a data center or server farm. FIG. 6 illustrates an example network configuration 600 that can be used to route communications between specific host machines or other such devices in such an environment. This example shows a typical design that can be used for a data center, wherein a source such as a client device 602 or application 604 is able to send requests across at least one network 606, such as the Internet or a cellular network, to be received by one or more components of the data center. Properties of various components of the network, such as provisioned instances, etc., can be managed using at least one management system, component, or service 620. In this example, the requests are received over the network to one of a plurality of core switches 608, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 608 is able to communicate with each of a plurality of aggregation switches 610, 612, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 610, 612 is linked to a plurality of physical racks 614, each of which typically contains a top of rack (TOR) or "access" switch 616 and a plurality of physical host machines 618, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 606. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 7:
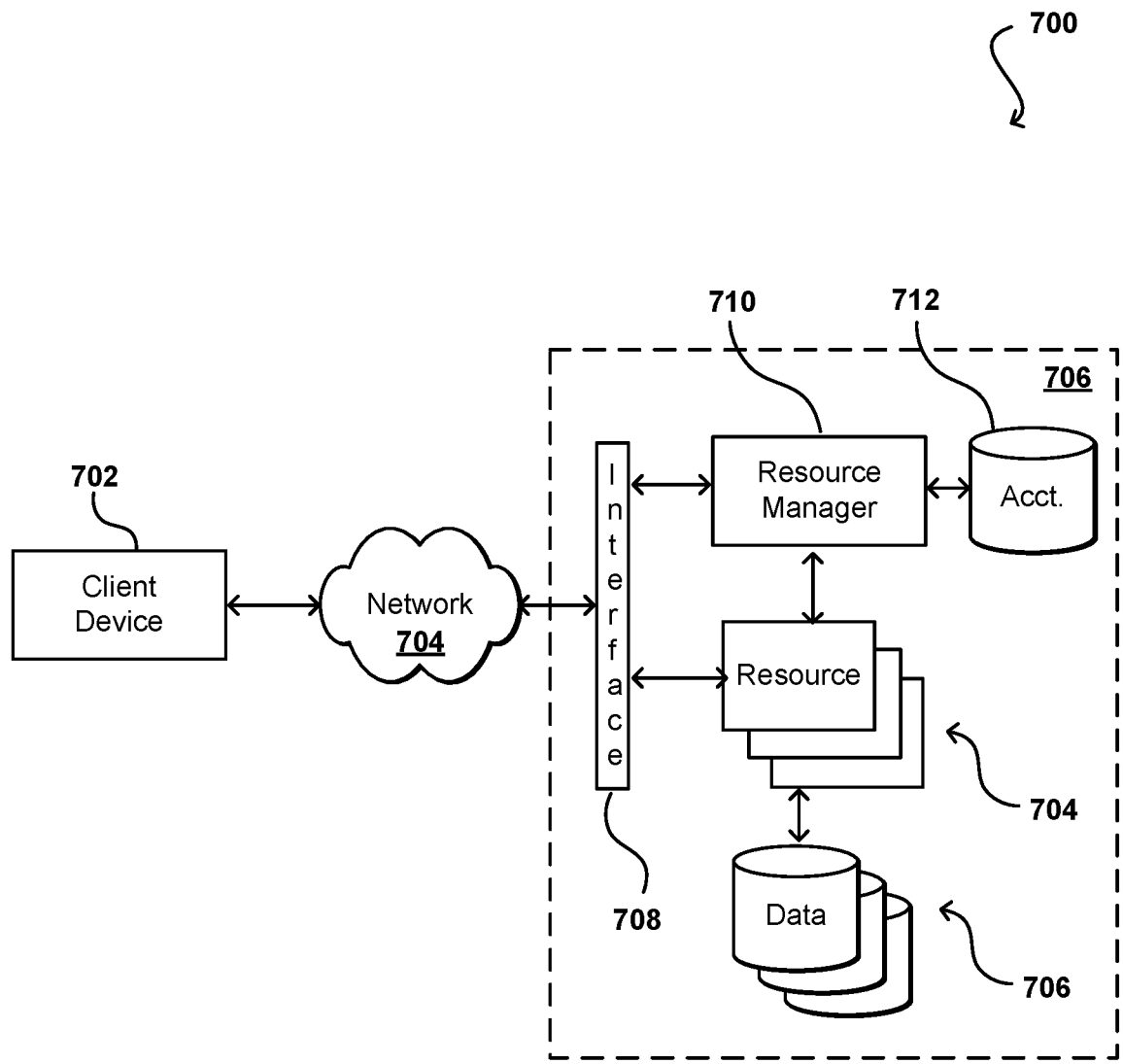
FIG. 7 illustrates components of another example environment in which aspects of various embodiments can be implemented.

As mentioned, such a configuration can be used in some embodiments to provide resource capacity for one or more users or customers as part of a shared resource environment. FIG. 7 illustrates an example of one such environment 700 in which aspects of the various embodiments can be implemented. In this example a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as JavaR, C, C # or C++ or any scripting language, such as Perl, Python or TCL, as well as combinations thereof. The server(s) may also include database servers, including without limitation those commercially available from Oracle®, Microsoft®, and IBM® as well as open-source servers such as MySQL, Postgres, SQLite, MongoDB, and any other server capable of storing, retrieving and accessing structured or unstructured data.

Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   a system on chip (SoC) device;
   an input/output device to receive a boot signal, the boot signal including instructions for configuring an operational mode of the SoC device; and
   a boot manager including logic to cause the SoC device to:
   receive a first boot image including instructions to restrict access to a set of security features of the SoC device;
   configure the SoC device to operate using a first configuration based on the first boot image restricting access to each security feature of the set of security features;
   receive a second boot image including instructions to permit access to an identified security feature of the set of security features of the SoC device;
   determine the second boot image is a verified image, the second boot image including a key verified by a stored key on the SoC device; and
   in response to verifying the second boot image, configure the SoC device to operate using a second configuration based on the first boot image and second boot image, the second configuration permitting access to the identified security feature and maintaining restricted access to the remaining security features of the set of security features associated with the first configuration.

2. The system of claim 1, wherein the set of security features correspond to at least one of access to cryptographic materials, access to stored keys, access to boot operations, or fuse burning operations.

3. The system of claim 1, wherein the second boot image includes a plurality of boot images, the logic further causing the SoC device to:
   determine a third image is a third verified image; and
   determine a fourth image is a fourth verified image, wherein booting of the plurality of boot images succeeds when each boot image of the plurality of boot images is verified.

4. The system of claim 1, the logic further causing the SoC device to:
   receive a third boot image including instructions to permit access to an additional security feature of the set of security features of the SoC device;
   determine verification of the third boot image fails; and
   operate the SoC device using the second configuration blocking access to the additional security feature.

5. The system of claim 1, wherein the second configuration is reset upon the next restart of the SoC device.

6. A computer-implemented method, comprising:
   executing a portion of a boot process of an integrated circuit, the boot process including instructions to block access to one or more security features;
   receiving a signed image corresponding to a task associated with an identified security feature of the one or more security features;

determining the signed image is a verified image; and
in response to determining the signed image is a verified image, operating the integrated circuit using a configuration to permit access to the identified security feature and to block access to the remaining one or more security features.

7. The computer-implemented method of claim 6, further comprising:
receiving a boot signal to the integrated circuit, the boot signal including instructions for configuring an operational mode of the integrated circuit.

8. The computer-implemented method of claim 7, wherein the instructions include the signed image.

9. The computer-implemented method of claim 6, wherein the boot process is a measured boot process.

10. The computer-implemented method of claim 6, further comprising:
retrieving a key from a memory; and
evaluating the signed image using the key.

11. The computer-implemented method of claim 6, further comprising:
receiving a plurality of images;
determining a first image is a first verified image;
determining a second image is a second verified image;
determining a third image is an unverified image; and
operating the integrated circuit using the configuration to permit access to respective security features verified by the first verified image and the second verified image and to block access to a security feature associated with the unverified image.

12. The computer-implemented method of claim 6, wherein the identified security feature corresponds to at least one of access to cryptographic materials, access to stored keys, access to boot operations, or fuse burning operations.

13. The computer-implemented method of claim 6, wherein the identified security feature corresponds to two of the security features.

14. A computer-implemented method, comprising:
executing a portion of a boot process of an integrated circuit, the boot process to block access to one or more security features, wherein the integrated circuit is a system on chip (SoC) device;
receiving a signed image corresponding to a task associated with an identified security feature of the one or more security features;
determining the signed image is a verified image; and
operating the integrated circuit using a configuration to permit access to the identified security feature and to block access to the remaining one or more security features.

15. An integrated circuit (IC) device, comprising:
a substrate supporting interconnected electronic components;
an input/output device mounted on the substrate to receive a boot signal; and
a boot manager including logic to cause a first portion of a boot process to execute to block access to a set of security features, to verify a signature of an image corresponding to instructions to permit access to an identified security feature of the set of security features, and to configure the integrated circuit device to permit access to the identified security feature and to continue blocking access to the remaining set of security features.

16. The IC device of claim 15, wherein the boot process is a measured boot process.

17. The IC device of claim 15, wherein the boot manager includes logic to further receive a key corresponding to the signature.

18. The IC device of claim 15, wherein the image is provided with the boot signal.

19. The IC device of claim 15, wherein the identified security feature corresponds to at least one of access to cryptographic materials, access to stored keys, access to boot operations, or fuse burning operations.

20. An integrated circuit (IC) device, wherein the integrated circuit is a system on chip (SoC) device, comprising:
a substrate supporting interconnected electronic components;
an input/output device mounted on the substrate to receive a boot signal; and
a boot manager including logic to cause a first portion of a boot process to execute, to verify a signature of an image corresponding to instructions to permit access to an identified security feature, and to configure the integrated circuit device to permit access to the identified security feature and to block access to one or more additional security features of the boot process.

* * * * *